(12) United States Patent
Westermark et al.

(10) Patent No.: US 7,634,381 B2
(45) Date of Patent: Dec. 15, 2009

(54) POSITION CONTROL ARRANGEMENT, ESPECIALLY FOR A SURVEYING INSTRUMENT, AND A SURVEYING INSTRUMENT

(75) Inventors: Magnus Westermark, Enskede (SE); Mikael Hertzman, Sollentuna (SE); Ulf Berg, Stockholm (SE); Thomas Klang, Sollentuna (SE)

(73) Assignee: Trimble A.B., Danderyd (SE)

( * ) Notice: Subject to any disclaimer, the term of this patent is extended or adjusted under 35 U.S.C. 154(b) by 148 days.

(21) Appl. No.: 11/084,797

(22) Filed: Mar. 18, 2005

(65) Prior Publication Data

US 2005/0187734 A1 Aug. 25, 2005

Related U.S. Application Data

(63) Continuation-in-part of application No. PCT/SE03/01375, filed on Sep. 4, 2003.

(30) Foreign Application Priority Data

Sep. 20, 2002 (SE) .................................... 0202793

(51) Int. Cl.
*G01C 19/00* (2006.01)
*G01C 1/00* (2006.01)
(52) U.S. Cl. ..................................................... 702/151
(58) Field of Classification Search .................. 702/94, 702/95, 150–153; 700/192, 193
See application file for complete search history.

(56) References Cited

U.S. PATENT DOCUMENTS

| 3,996,454 A * | 12/1976 | Froyd .......................... 318/565 |
| 5,177,418 A * | 1/1993 | Muller ......................... 318/265 |
| 5,852,493 A * | 12/1998 | Monnin .................... 356/141.1 |
| 6,593,854 B2 * | 7/2003 | Brown .......................... 340/682 |
| 7,136,733 B2 * | 11/2006 | Liu et al. ....................... 701/43 |
| 2002/0005944 A1 * | 1/2002 | Pratt et al. ............... 356/152.1 |
| 2009/0024342 A1 * | 1/2009 | Hertzman et al. ............. 702/94 |
| 2009/0133273 A1 * | 5/2009 | Westermark et al. .......... 33/281 |

FOREIGN PATENT DOCUMENTS

| JP | 11-311517 | * | 9/1999 |
| WO | 2004/113835 | * | 12/2004 |
| WO | 2006/074768 | * | 7/2006 |

\* cited by examiner

*Primary Examiner*—Michael P Nghiem
(74) *Attorney, Agent, or Firm*—Cooper & Dunham LLP (57) ABSTRACT

In a position control arrangement for controlling the rotational position of a movable unit, especially for a surveying instrument, an electric motor is arranged to rotate the movable unit around an axis of rotation, and there are controllers for enabling the motor to stop the movable unit in a desired rotational position. The motor is a direct drive motor, the shaft of which forms the axis of rotation for the movable unit, and the motor is arranged to selectively operate in either a first, normal mode for rotating the movable unit to a desired position, or in a second, friction mode for providing resistance to a forced rotation of the movable unit from a predetermined position to a new position. A control unit detects the presence of a forced rotation and automatically changes the mode of operation in response thereto.

19 Claims, 4 Drawing Sheets

POSITION CONTROL ARRANGEMENT, ESPECIALLY FOR A SURVEYING INSTRUMENT, AND A SURVEYING INSTRUMENT

This application is a continuation-in-part (CIP) of PCT/SE2003/001375, filed Sep. 4, 2003, claiming priority of Swedish application SE 0202793-6, filed Sep. 20, 2002.

FIELD OF THE INVENTION

The present invention relates to a position control arrangement, and in particular to a position control arrangement for controlling the operation of a motor adapted to rotate a movable unit, which may be an optical movable unit of the type forming part of a surveying instrument, including a survey instrument known as a total station.

BACKGROUND OF THE INVENTION

In surveying instruments, especially in so-called total stations, it is often required to position a movable unit in the instrument by rotating the movable unit around a horizontal or a vertical axis. The rotation around an axis is normally made via a gear arrangement, either by hand for a manual instrument or by means of an electric motor that is connected to the gear arrangement for an automated instrument. Such a gear arrangement needs to be of very high precision in order to serve its purpose, especially when the instrument is intended to automatically move from one position to another, for instance by means of a tracking arrangement. Such an instrument with a suitable gear arrangement is expensive. Also, in order to meet strict precision requirements, a preloading of the gear arrangement is required. Due to the resulting backlash and hysteresis in the gear arrangement there is a need, in an automated instrument, to have angle sensors both on the motor and on the movable unit in order to obtain a sufficiently stable and exact servo loop for controlling the motor.

The presence of a gear arrangement between the motor and the movable unit prevents a forced movement by hand of the movable unit to a new position, since the gears will block such a movement. In order, however, to allow a forced movement by hand of the movable unit to a new position it has been common to provide a friction clutch between a gear arrangement and the movable unit, thus allowing the movable unit to move while the gear arrangement remains in position.

By using a gear arrangement and two angle sensors as well as a friction clutch at each axis around which the movable unit is to be moved by a motor, the surveying instrument becomes relatively complicated and expensive. There is therefore a need for an improved design in these respects.

As regards general rotation of a movable unit in a surveying instrument it is previously known through US 2002/0005944 A1, now U.S. Pat. No. 6,621,565, to provide an optical transmitter, where a head assembly is rotated around a vertical axis by means of a direct drive electric motor, and where there are means to emit light signals to a distant receiver at certain rotational positions for the head assembly. For an arrangement of this kind there is, however, no need or intention to stop the head assembly in a certain rotational position. Also, there is no need to make possible a forced rotation of the head assembly.

OBJECTS OF THE INVENTION

It is an object of the invention to provide an improved position control arrangement that is simpler and that is cheaper to manufacture. It is another object to provide a position control arrangement that is highly accurate in use, while being simple to operate. A further object is to provide an arrangement that requires less space. A still further object is to provide an improved surveying instrument.

SUMMARY OF THE INVENTION

The embodiments of the invention include a method and apparatus for controlling angular movement of a movable unit between an existing angular position and a desired angular position. The method comprises deriving an error signal representing an angular difference between the existing position and the desired position of the movable unit, monitoring a first voltage caused by incident forced angular movement of the movable unit, and generating a second voltage when either said error signal or said first voltage exceeds a respective predetermined threshold amount. The second voltage represents an angular force sufficient to retard the angular movement of the movable unit caused by incident force and is generated by calculating from the rate of change of the angular movement caused by incident force a value defining the angular force to oppose such forced angular movement. The angular force is applied to the movable unit in opposition to the angular movement of the movable unit caused by the incident force but, in one embodiment, only if it is less than a predetermined value. Such an opposition force may not be generated when it is determined that the velocity of the angular movement of the movable unit caused by incident force is less than a predetermined threshold amount. The second voltage drives a direct-drive electric motor adapted to rotate the movable unit.

The apparatus of an embodiment of the invention includes a motor, which may be a direct-drive electric motor, for controllably applying torque to the movable unit about an axis of rotation, a position detector to detect actual rotational position of the movable unit, and a control circuit for selectively operating the motor in one of a normal mode and a friction mode. In the normal mode the control circuit is responsive to the difference between the actual angular position of the movable unit and a desired angular position of the movable unit. In controlling the motor to rotate the movable unit to the desired rotational position the control circuit attempts to drive the difference to zero. In the friction mode the control circuit controls the motor to apply a torque resisting a change of rotational position of the movable unit caused by incident force while permitting the incident force to rotate the movable unit. The control circuit is operative selectively to change operation of the motor from the normal mode to the friction mode when incident force causes rotation of the movable unit. The control circuit monitors the angular velocity of the movable unit during a forced rotation and returns the operating mode of the motor to the normal mode when the forced angular velocity of the movable unit is lower than a predetermined threshold.

The control system of an embodiment of the invention may constitute a computer system consisting of a processor and a computer recording medium including computer executable code executable by said processor. The computer executable code includes code for deriving error data representing an angular difference between the existing position and the desired position of the movable unit, code for monitoring data representing a voltage value derived from the application of incident force to rotate the movable unit, code for comparing the error data and voltage value data to respective predetermined threshold amounts, and code for generating a control signal when either the angular difference error or the voltage value exceeds the respective predetermined threshold amount. The control signal is applied to cause a change in the operating mode of the motor from a normal mode to a friction mode. With respect to friction mode, the computer system includes code for determining and monitoring a rate of change in the angular movement of the movable unit caused by incident force and determining therefrom a velocity of such forced angular movement of the movable unit. Additional code may be implemented for calculating from the rate of change of angular movement a value representing a resisting angular force to oppose the forced angular movement of the movable unit. A direct-drive electric motor may be used to apply the resisting angular force to the movable unit in opposition to angular movement of the movable unit caused by incident force. The computer system determines when the angular velocity of the movable unit caused by incident force is lower than a predetermined threshold and consequently returns the operating mode of the motor to its normal mode.

By providing a direct-drive electric motor the need for a gear arrangement is eliminated, and by making it possible to selectively operate the motor in a normal mode or in a friction mode, the need for a conventional friction clutch for allowing a forced rotation of the movable unit is eliminated.

By providing means for automatically switching the mode of operation for the motor in response to the presence of an external force influencing the movable unit, a simple operation is made possible, since the operator does not have to be concerned about selecting a mode of operation.

In a further embodiment a friction control unit is adapted to control, in friction mode, the magnitude of resistance to forced rotation. The friction control unit is also arranged to limit such resistance to a selected value. In this way good precision can be obtained when manually shifting the position of the movable unit.

The elimination of the gear arrangement also provides a more quiet and quick operation when shifting the movable unit from one position to another.

The control system of embodiments of the invention is particularly useful in connection with the surveying instrument known as a total station. In total stations generally the movable unit is within a fixed housing of the survey instrument and is mounted for rotation back and forth with respect to the housing in both horizontal and vertical directions. The movable unit contains the survey optical equipment. Two motors may be used each having a shaft defining the axis of rotation of the movable unit in one of the horizontal and vertical directions. It will be understood that a survey instrument in which a single motor is adapted for use in driving the movable unit about mutually perpendicular axes is within the scope of the present invention. Control over each motor may be exercised according to the foregoing method and apparatus, including by a programmed computer system. The motors may be direct-drive electric motors.

Further objects, features and advantages of the invention will become apparent from the following description of a preferred embodiment, with reference to the attached drawings.

DESCRIPTION OF A PREFERRED EMBODIMENT

Figure 1:
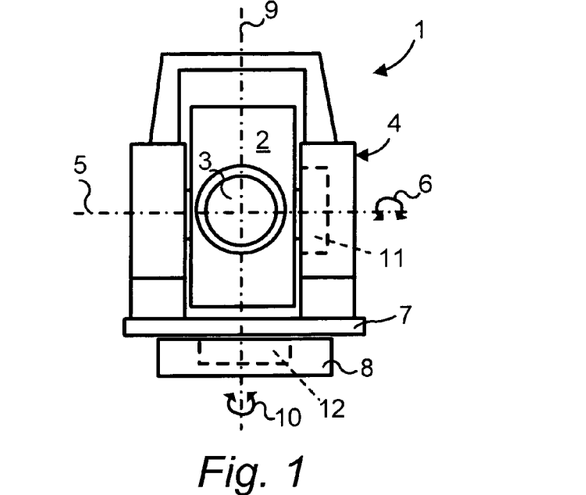
FIG. 1 is a front view of a surveying instrument embodying the invention.

FIG. 1 illustrates one application for the control system of an embodiment of the present invention. In FIG. 1 there is illustrated a front view of a surveying instrument 1 of the type commonly referred to as a total station. A movable unit 2, comprising optical equipment of the total station, as represented by a lens 3, is supported in a housing 4 in such a manner that it may be pivoted relative to the housing 4 around an essentially horizontal axis 5, as indicated by double arrow 6. The housing 4 comprises a base 7 by means of which it is supported on a stand 8 in such a manner that it is rotatable relative to the stand 8 around an essentially vertical axis 9, as indicated by double arrow 10. Thus, by rotating the movable unit 2 around the two axes 5 and 9 the movable unit 2 can be oriented in any desired position for the purpose of carrying out an intended surveying operation. For movement of the movable unit 2 around the axis 5 there is provided a motor arrangement 11 in the housing 4, and for movement of the housing 4 and the movable unit 2 around the axis 9 there is provided a similar motor arrangement 12 in the stand 8. Each of the two motor arrangements 11, 12 is included in a position control arrangement related to a respective axis 5 and 9, as described below, and each of the motor arrangements 11 and 12 may include a direct-drive electric motor. The surveying instrument 1 is intended to be supported via the stand 8 on a tripod, or similar equipment, in a conventional manner.

The two motor arrangements 11 and 12 are similar in design, and for the sake of simplicity only the motor arrangement 12 will be described below, while referring to FIG. 2, where portions of the stand 8 have been omitted for the sake of clarity.

Figure 2:
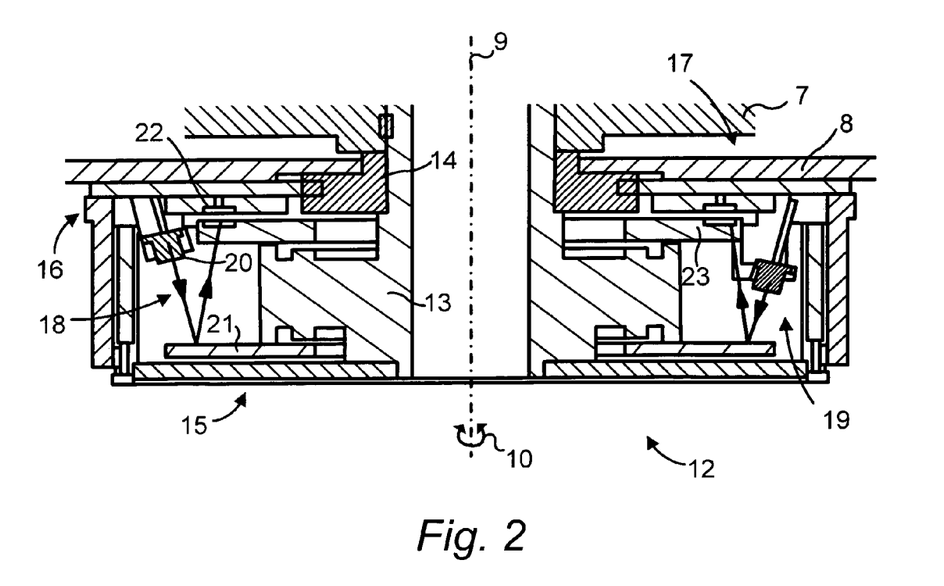
FIG. 2 is a schematic sectional view of a motor arrangement used in an inventive position control arrangement.

As shown in FIG. 2, a drive shaft 13 of the motor in one embodiment is rotatably supported by a bearing 14 secured in the upper portion of the stand 8 and engages non-rotatably the base 7 of the housing 4, so that the base 7 can be rotated by means of the drive shaft 13 in order to indirectly rotate the movable unit 2 around the axis 9. In this embodiment the drive shaft of the motor defines the rotational axis of the base. Also in the present embodiment, the drive shaft 13 non-rotatably carries the rotor 15 of the motor, while the stand 8 non-rotatably carries the stator 16 of the motor.

In order to be able to decide the actual rotational position of the drive shaft 13, and thus indirectly of the movable unit 2, there is provided a position detecting arrangement 17, which may include an angle sensor, that is arranged to detect a difference between the relative positions of the stator 16 and the rotor 15. In the embodiment shown, the position detecting arrangement 17 comprises two detecting units 18 and 19, which are located diametrically opposed around the drive shaft 13. These two detecting units 18, 19 are of essentially similar design. In each of them a light emitter 20 secured on the stator 16 intermittently directs light towards a reflector 21 secured on the drive shaft, and from said reflector light is reflected towards a sensor secured on the stator 16. On its way from the reflector 21 to the sensor 22 the light passes through a transparent disc 23 non-rotatably secured on the drive shaft 13. The disc 23 is provided with a pattern that causes specific position signals to be generated in the sensor 22 as the drive shaft 13 rotates. By using a high rate of signal production a high degree of position accuracy can be obtained by the position detecting arrangement 17.

The two detecting units 18, 19 can suitably be arranged to have their reflected light pass through radially different regions with mutually different patterns of the transparent disc 23 in order to allow improved accuracy of the position detecting arrangement 17.

It will be noted from FIG. 2 that the two detecting units 18 and 19 of the position detecting arrangement 17 are located in an essentially closed environment within the motor arrangement 12 and therefore are well protected. The number of detecting units 18, 19 as well as their location and their design can of course be varied as desired.

For controlling the motor arrangements 11 and 12 in order to obtain a desired position for the movable unit 2 there is provided a position control arrangement for each of the two motor arrangements. These position control arrangements are similar in design, and for the sake of simplicity only the position control arrangement related to the motor arrangement 12 will be described below. It will be understood that an embodiment of the invention consisting of a single position control arrangement having two channels, one for each motor arrangement, is within the scope of the present invention.

Figure 3:
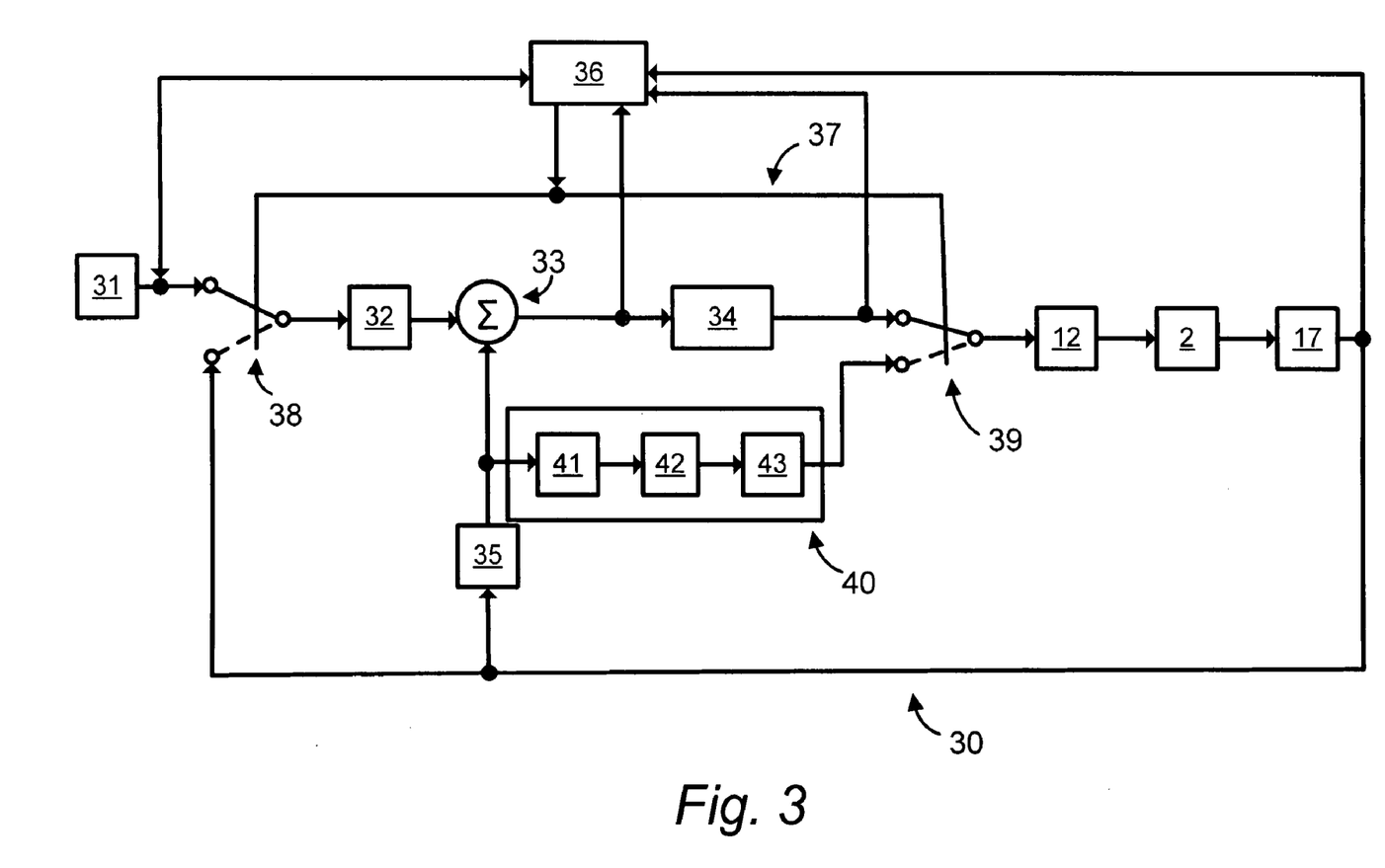
FIG. 3 is a block diagram illustrating an inventive position control arrangement.

Referring now to FIG. 3, there is disclosed schematically in block diagram form an inventive position control arrangement 30 related to the motor arrangement 12. There is provided an input means 31, by means of which the position control arrangement 30 receives information about the intended position or attitude for the movable unit 2 that is operated by the motor arrangement 12. Such intended position information can be provided to the input means via input by an operator, for example via a joystick or other means, or automatically by one or more units in a surveying system. As an example, the surveying system might comprise a tracking arrangement for enabling the movable unit to automatically follow a target. The target may transmit information concerning its location directly to suitable input means at 31. Several other techniques for inputting data concerning an intended or desired position for the movable unit 2 are previously known and need not be described in further detail here.

Signals from the input means 31 are, in normal operation, fed to a filter unit 32. The filter 32 acts to smooth the output from the input means 31. That is, for a large change in intended position relative to the actual position of the movable unit, the output from the filter 32 ramps up or down at a substantially constant acceleration and deceleration. It will be understood that the smoothing function can be implemented within the input means 31, as desired, without departing from the scope of the present invention. The output from the filter 32 is fed to an adding unit or comparator 33, the output from which is fed to a regulator 34, which may be a Kalman filter, that controls the voltage to be applied to drive the motor 12. In response to the voltage input the motor 12 brings about a movement of the movable unit 2 (in this case via the housing 4 and around the axis 9), which in turn causes the position detecting arrangement 17 to generate a position signal corresponding to the actual position of the movable unit 2. In a connection between the position detecting arrangement 17 and the adding unit 33 there is provided a sign change unit 35 that changes the sign of the position signal fed to the adding unit 33. In this way there is provided a control loop for governing the motor 12 to an intended rotational position. As long as there is a difference between the signals received in the adding unit 33 from the filter unit 32 and the sign change unit 35, the regulator 34 will receive a signal and output a voltage, causing the motor 12 to run. The purpose of the loop is to drive the difference to zero at which point the regulator 34 will receive no signal and the motor will automatically stop. The motor can be controlled so as to turn the movable unit in either direction. The direction of rotation will depend upon the sign of the control error output from the unit 33.

There is also provided a control unit 36, which receives input signals from the input means 31, the position detecting arrangement 17, the regulator 34, and the adding unit 33. On the basis of these signals the control unit 36, which may be part of a computer system, decides if the position control arrangement 30 should operate in a normal mode, as disclosed above, or in a friction mode, to be described below. To this end the control unit 36 controls a switch arrangement 37 comprising two switches 38 and 39, which may be digital switches, included as part of the position control arrangement 30. The switch 38 operates between the input means 31 and the filter unit 32 and is capable of connecting the filter unit 32 either with the input means 31 (normal mode, shown with a full line) or with the position detecting arrangement 17 (friction mode, shown with a dashed line). The switch 39 operates between the regulator 34 and the motor 12 and is capable of connecting the motor 12 either with the regulator 34 (normal mode, shown with a full line) or with the sign change unit 35 via a friction control unit 40 (friction mode, shown with a dashed line).

If, during normal operation, an operator wants to quickly set the movable unit 2 into a new attitude or position, the operator can manually force the movable unit 2 to rotate around either axis toward a desired attitude. In accordance with the friction mode of operation, such action will cause the motor to apply a force resisting the manual movement of the movable unit. According to an embodiment of the invention, when the movable unit 2 is manually rotated in such a way, the position detecting arrangement 17 will detect a large and quick change in position of the movable unit 2. That is, the output from the position detecting arrangement 17 can represent an unusually large acceleration in the rotational movement of the movable unit. This can cause an abnormality in the output error signal from the adding unit 33 which, in turn, will cause the output voltage from the regulator 34 to be unusually large. The unusually large voltage value is applied to the monitoring control unit 36. In an embodiment of the invention, the control unit 36 compares the voltage signal input from the regulator 34 to a predetermined threshold value. If the received voltage value exceeds the threshold value, a control signal is output by the control unit 36 which activates the switches 38 and 39 to connect the motor 12 to the friction control unit 40, thereby switching the system to friction mode. As an example, if the value of the output voltage from the regulator 34 is determined to be about twice what that output voltage is under normal operation then the control unit 36 determines that the system should no longer be in normal mode and should be switched to friction mode.

It should be understood that forced manual turning of the movable unit may also cause a large difference to appear between the signal values representing the actual position of the movable unit 2, as determined by the position detectors at 17, and the signal values output from the input unit 31, which represent the previous intended position for the movable unit 2. An unusually large difference between those signal values will provoke an unusually large error signal or error angle value to be output from the adding unit 33. An output error signal from the adding unit 33 representing this large difference between the position values input thereto is fed to the control unit 36. The control unit 36 compares the received error signal to a predetermined threshold and may determine as a result that the operation mode is no longer normal. If so, a control signal is output from the control unit 36 to cause the switches 38 and 39 to shift from the normal mode position, represented by full lines, to the friction mode position, represented by dashed lines. As a result, both the filter unit 32 and adding unit 33 will now receive input signals directly from the position detecting arrangement 17 concerning the actual position of the movable unit 2. Also, the motor 12 will become connected to the friction control unit 40 rather than to the regulator 34, the output from which will be substantially zero under such conditions.

It is important to note that either a large error signal from the adding unit 33 or a large voltage output from the regulator 34 may trigger the control unit 36 to switch the system from the normal mode to the friction mode. The values required to cause a change in operating mode are significantly larger than the largest error signal produced by the adding unit 33 and the largest voltage output from the regulator 34 obtained when the system is operating in the normal mode. For example, the threshold output voltage of the regulator 34 for causing the control unit 36 to switch the system from the normal mode to the friction mode may be about twice the largest voltage output occurring from the regulator 34 during operation in the normal mode. Alternatively, the magnitude of the error signal produced by the adding unit 33 sufficient to cause the control unit 36 to switch the system from normal mode to the friction mode may be in a range of from 10 to 50 times the largest error signal output from adding unit 33 expected during the normal mode of operation.

An advantage of setting a threshold for causing the control unit 36 to switch from the normal mode to the friction mode using either the output of the adding unit 33 or the output of the voltage regulator 34, as described above, is that an accidental switching to the friction mode is prevented even when a large change of intended position is input to the input means 31. It should be understood by a person of ordinary skill in the art that smoothing the output of the input means 31 is also an important feature in preventing this accidental switching.

In response to the forced movement experienced by the movable unit 2 the friction control unit 40 causes the motor 12 to produce a torque resisting the forced movement. The magnitude of this torque may be decided as a function of the temporary acceleration and speed of the forced movement, so as to adapt the magnitude of the torque to the kind of movement performed. It will be understood that the character of the resisting torque can be selected in many ways and might easily be changed by a change in software in the friction control unit 40. In an embodiment of the invention the magnitude of the torque allowed by the friction control unit 40 is limited to less than a predetermined value in order to protect the motor 12.

The control unit 36 determines the rate of change of angular movement of the movable unit caused by incident force and from that calculates the velocity of resulting angular movement of the movable unit. So long as these values exceed predetermined threshold values, the control unit 36 maintains the system in friction mode. Once the forced movement of the movable unit 2 ceases, for example after reaching a manually fixed position, the control unit 36 will, on the basis of position information received from the position detecting arrangement 17, notice that the rate of change of position or angular velocity of the movable unit have become quite small, i.e. have dropped below the predetermined threshold values. The control unit determines therefore that the position control arrangement 30 now in fact should operate the system in normal mode. As a result, the switches 38 and 39 are operated to reset the arrangement 30 from friction mode to normal operating mode (shown in full lines in FIG. 3) as described above.

When the control unit 36 causes the switch from the friction mode to the normal mode, the control unit 36 resets the input means 31 with the manually fixed position achieved while the system was operating in the friction mode. This resetting is performed to prevent the movable unit 2 from being returned to the previously set intended position once the system has returned from the friction mode to the normal mode of operation.

Figure 5:
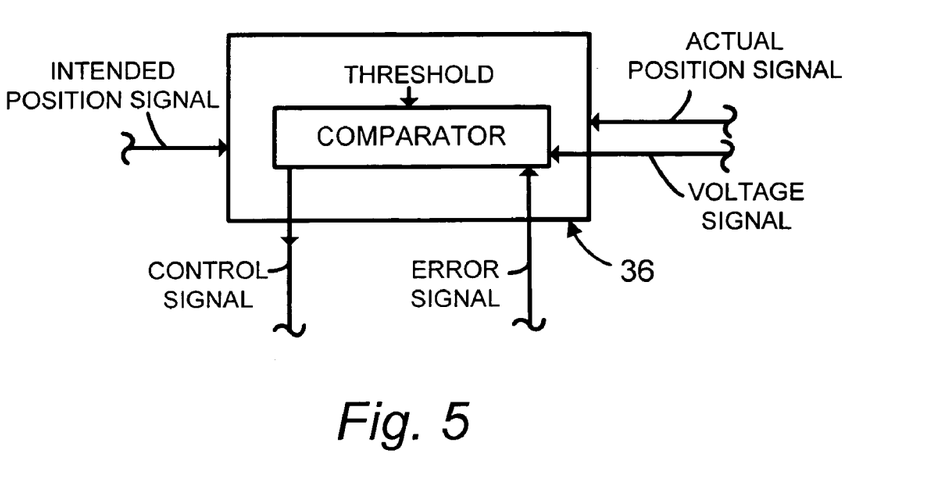
FIG. 5 is a block diagram illustrating one embodiment of the control unit from FIG. 3.

The friction control unit 40 can comprise a derivating module 41 adapted to calculate from the signals provided by the position detectors 17 the rate of change in the angular position of the movable unit 2 and its rotational direction induced, for example, by a manually forced rotation of the movable unit. The forced rate of change in angular position is fed to a proportioning module 42 which then calculates those counter torque direction and values which are related to the direction of and the rates of change of angular position caused by the manual action. A limiting module 43 for limiting the value of the resistive torque to be applied is provided to receive the output of the proportioning module 42. The limiting module may include a digital filter which passes only those values corresponding to an output voltage representing a counter torque that is less than a predetermined value. The counter torque generated in friction mode resembles a viscous friction from a conventional friction device such as a slipping clutch or similar arrangement, that is, the faster the movable unit 2 is turned the more braking is perceived. The modules 41-43 of the friction control unit 40 can be implemented in software.

It will be understood that if a survey instrument, for example, has two drive motors 11 and 12, one for each of the horizontal and vertical axes, each of the motors may, if desired, have a dedicated position control arrangement 30 as described above. Alternatively, a simpler and more compact embodiment comprising fewer parts may be provided in which a single position control arrangement having dual channels is used to control the operation of each of the two motors.

In order to obtain a good precision it is desirable to use an angle position sampling rate of about 1000 Hz and to let the light emitters 20 generate very short flashes of light. Each flash could have a duration of only a few microseconds. The angular velocity of each motor arrangement 11, 12 might have a maximum value of about 1 or 2 rad/s, and the maximum angular acceleration might be around 3 rad/s$^2$. It is also desirable that the power consumption of each motor is as low as possible, since the motors normally will be battery operated in order to provide flexible use of the surveying instrument.

For precision control of a motor it is desirable to take into account the inertia of the parts to be moved, in order to monitor the torque so that adequate acceleration and retardation is obtained to provide quick and accurate positioning.

Figure 4:
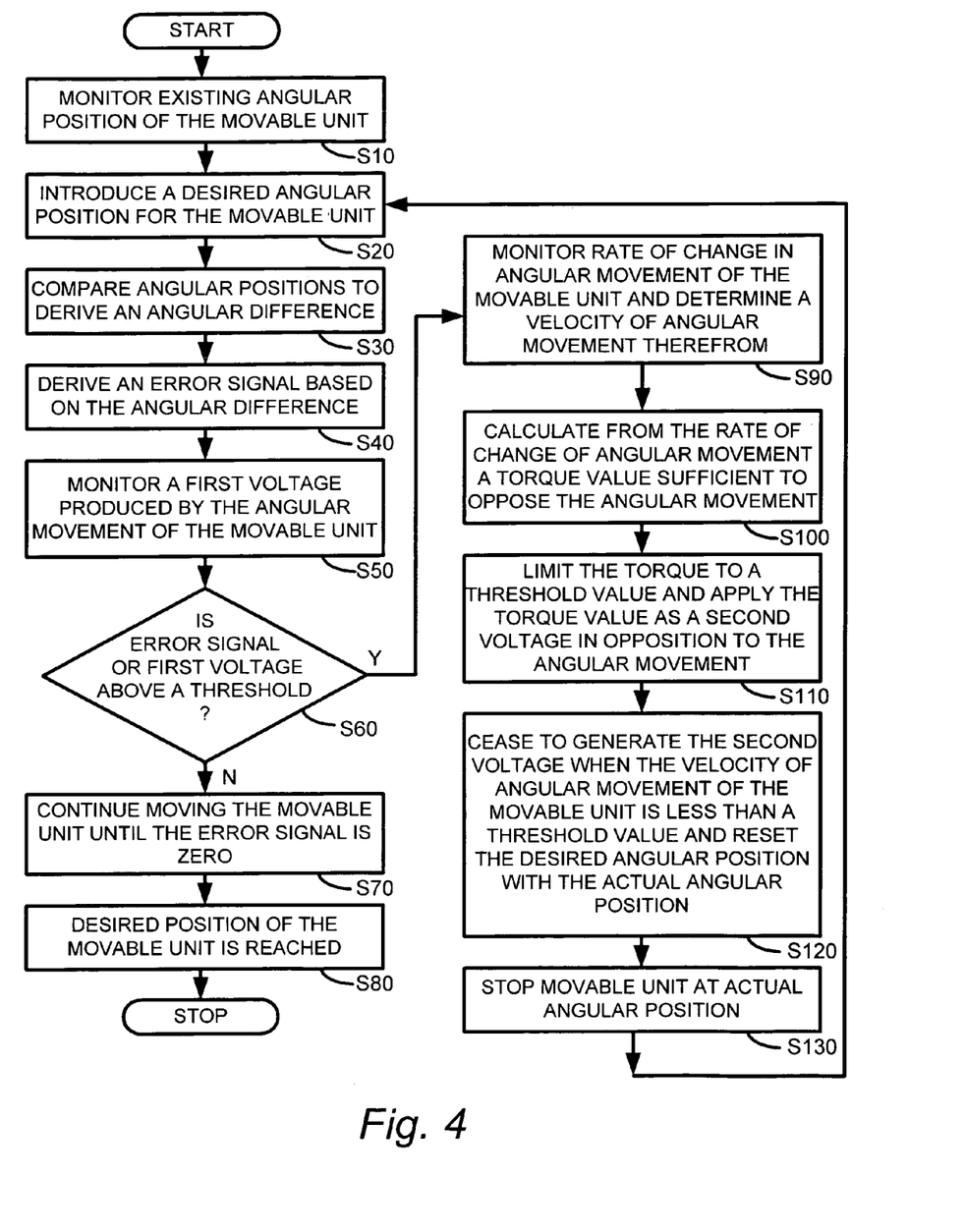
FIG. 4 is a flowchart illustrating an inventive position control method implemented in a computer.

It will be clear by the above description and by the flowchart of FIG. 4 that a method for controlling angular movement of a movable unit can be implemented in a computer system including a processor and a computer recording medium including computer executable code executable by the processor.

As shown in FIG. 4, an implemented method would include the steps of monitoring an existing angular position of a movable unit in step S10, introducing a desired angular position for the movable unit in step S20, comparing the existing angular position and the desired angular position to derive an angular difference in step S30, deriving an error signal based on the angular difference in step S40, and monitoring in step S50 a first voltage resulting from angular movement of the movable unit caused by incident force on the movable unit.

When the error signal or the first voltage signal are not above respective thresholds in step S60, the implemented method continues the movement of the movable unit until the error signal is zero in step S70. This is when the desired position is reached and the movable unit is stopped at this position in step S80.

When the error signal or the first voltage signal are above the respective thresholds in step S60, the implemented method goes on to monitoring the rate of change in angular movement of the movable unit and determining therefrom a velocity of angular movement of the movable unit in step S90, calculating from the rate of change of angular movement a torque value sufficient to oppose the angular movement in step S100, and limiting the torque to a threshold value and applying the torque value as a second voltage to the movable unit in opposition to the angular movement of the movable unit in step S110.

Further, in step S120, the implemented method goes on to cease to generate the second voltage when the velocity of angular movement of the movable unit is less than a threshold value and resets the desired angular position with the actual angular position. In step S130 the movable unit is stopped at this actual angular position.

It will also be understood that within the scope of the invention various other changes than the ones mentioned can be made to the disclosed embodiment, and that the scope of the present invention is defined by the following claims:

What is claimed is:

1. A method for controlling angular movement of a movable unit between an existing angular position and a desired angular position, the method comprising:
    deriving an error signal representing an angular difference between the existing position and the desired position of the movable unit;
    generating a first voltage from the angular movement of the movable unit caused by incident force;
    comparing said error signal and said first voltage to a respective predetermined threshold amount;
    generating a second voltage when either said error signal or said first voltage exceeds the respective predetermined threshold amount; and
    causing said second voltage to induce an angular force on the movable unit counter to said angular movement caused by said incident force.

2. The method of claim 1 wherein said error signal is obtained by
    monitoring the existing angular position of the movable unit;
    introducing the desired angular position for the movable unit; and
    comparing said existing angular position and said desired angular position to derive a difference representing said error signal.

3. The method of claim 2, comprising changing the angular position of the movable unit until said error signal is substantially zero.

4. The method of claim 1 in which said induced angular force is sufficient to retard the angular movement of the movable unit caused by said incident force.

5. The method of claim 4 in which said second voltage is generated by
    determining rates of change of angular movement of the movable unit caused by said incident force;
    calculating from said rates of change of angular movement caused by said incident force corresponding values representing said induced angular force;
    filtering said corresponding values to pass values less than a predetermined threshold value; and
    generating said second voltage based upon said passed values.

6. The method of claim 5 comprising monitoring said rates of change of angular movement of the movable unit caused by said incident force and determining therefrom a velocity of angular movement of the movable unit caused by said incident force.

7. The method of claim 6 in which said induced angular force is applied to the movable unit in opposition to the angular movement of the movable unit caused by said incident force if said induced angular force is less than a predetermined value.

8. The method of claim 7 in which said second voltage is not generated when said velocity of angular movement of the movable unit caused by said incident force is less than a predetermined threshold amount, the desired angular position being reset as the existing angular position of the movable unit when said velocity of angular movement of the movable unit caused by said incident force is substantially zero.

9. The method of claim 8 in which said second voltage drives an electric motor adapted to apply said induced angular force to the movable unit.

10. The method of claim 9 in which said electric motor is a direct-drive motor.

11. A computer system for controlling angular movement of a movable unit between an existing angular position and a desired angular position, the computer system including a processor and a computer recording medium including computer executable code executable by said processor, the computer executable code comprising:
    code for deriving error data representing an angular difference between the existing position and the desired position of the movable unit;
    code for monitoring data representing a voltage value derived from the angular movement of the movable unit caused by incident force;
    code for comparing said error data and said voltage value with a respective predetermined threshold amount; and
    code for generating a control signal when either said angular difference error or said voltage value exceeds the respective predetermined threshold amount.

12. The computer system of claim 11 comprising, in addition, means for generating a control voltage when said control signal is present, said control voltage causing an angular force induced on the movable unit sufficient to retard said angular movement of the movable unit caused by said incident force.

13. The computer system of claim 12 further comprising code for determining the rate of change of angular movement of the movable unit caused by said incident force, and calculating therefrom a velocity of angular movement of the movable unit caused by said incident force.

14. The computer system of claim 13 further comprising code for calculating from said rate of change of angular movement caused by said incident force a value representing said induced angular force, and means for inducing said angular force on the movable unit in opposition to said angular movement of the movable unit caused by said incident force.

15. The computer system of claim 14 comprising, in addition, code for comparing said induced angular force to a predetermined value and generating a control signal to discontinue said induced angular force when it is greater than a predetermined value.

16. The computer system of claim 15 further comprising code for monitoring said velocity of angular movement of the movable unit caused by said incident force, and code for setting said control voltage to substantially zero when said velocity of angular movement of the movable unit caused by said incident force is substantially zero.

17. Apparatus for controlling angular movement of a movable unit between an existing angular position and a desired angular position, comprising:
- a first comparator receiving signals representing the existing and desired angular positions, said first comparator producing an error signal representing an angular difference between the existing position and the desired position of the movable unit;
- a first voltage control circuit responsive to the angular movement of the movable unit caused by incident force to produce a first voltage;
- a second comparator receiving said error signal and said first voltage, said second comparator producing a control signal when either said error signal or said first voltage exceeds a respective predetermined threshold amount; and
- a second voltage control circuit receiving said control signal and producing a second voltage representative of an angular force sufficient to retard angular movement of the movable unit caused by said incident force.

18. The apparatus of claim 17 comprising, in addition, a motor driven by said first voltage when said first voltage is less than said predetermined threshold amount to cause angular movement of the movable unit in one direction toward the desired angular position.

19. The apparatus of claim 18 in which said second voltage is connected to drive said motor to apply said angular force to retard said angular movement of the movable unit caused by said incident force.

\* \* \* \* \*